United States Patent
Aksoy et al.

(10) Patent No.: US 11,315,328 B2
(45) Date of Patent: Apr. 26, 2022

(54) SYSTEMS AND METHODS OF RENDERING REAL WORLD OBJECTS USING DEPTH INFORMATION

(71) Applicant: Facebook Technologies, LLC, Menlo Park, CA (US)

(72) Inventors: Volga Aksoy, Redwood City, CA (US); Dean Joseph Beeler, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/774,885

(22) Filed: Jan. 28, 2020

(65) Prior Publication Data
US 2020/0302682 A1    Sep. 24, 2020

Related U.S. Application Data

(60) Provisional application No. 62/820,052, filed on Mar. 18, 2019.

(51) Int. Cl.
G06T 19/00 (2011.01)
G06T 15/40 (2011.01)
(Continued)

(52) U.S. Cl.
CPC .......... G06T 19/006 (2013.01); G06T 7/579 (2017.01); G06T 7/593 (2017.01); G06T 15/405 (2013.01);
(Continued)

(58) Field of Classification Search
CPC ..... G06T 15/405; G06T 19/006; G06T 7/579; G06T 7/593; H04N 13/239; H04N 13/243;
(Continued)

(56) References Cited

U.S. PATENT DOCUMENTS

| 2011/0026809 A1* | 2/2011 | Jeong | G06T 7/97 |
| | | | 382/154 |
| 2013/0100125 A1* | 4/2013 | Zhang | G06T 5/005 |
| | | | 345/419 |

(Continued)

FOREIGN PATENT DOCUMENTS

WO    WO-2017/220966 A1    12/2017

OTHER PUBLICATIONS

Chen, Yibin, Canhui Cai, and Kai-Kuang Ma. "Stereoscopic video error concealment for missing frame recovery using disparity-based frame difference projection." 2009 16th IEEE International Conference on Image Processing (ICIP). IEEE, 2009. (Year: 2009).*

(Continued)

*Primary Examiner* — Daniel F Hajnik
(74) *Attorney, Agent, or Firm* — Foley & Lardner LLP

(57) ABSTRACT

A system can include a device and a graphics processing unit (GPU). The device can be configured to receive a first image from one or more cameras corresponding to a first view and a second image from the one or more cameras corresponding to a second view. The GPU can include a motion estimator and configured to receive the first image and the second image and be configured to receive the first image and the second image. The motion estimator can be configured to determine first disparity offsets for the first image and second disparity offsets for the second image. The device can be configured to generate, for rendering 3D image using the first image and the second image, a first depth buffer for the first image derived from the first disparity offsets and a second depth buffer for the second image derived from the second disparity offsets.

20 Claims, 4 Drawing Sheets

(51) Int. Cl.
  *G06T 7/579* (2017.01)
  *H04N 13/111* (2018.01)
  *H04N 13/128* (2018.01)
  *G06T 7/593* (2017.01)
  *H04N 13/00* (2018.01)
  *H04N 13/243* (2018.01)
  *H04N 13/344* (2018.01)
  *H04N 13/239* (2018.01)

(52) U.S. Cl.
  CPC ......... *H04N 13/111* (2018.05); *H04N 13/128* (2018.05); *H04N 13/239* (2018.05); *H04N 13/243* (2018.05); *H04N 13/344* (2018.05); *H04N 2013/0081* (2013.01)

(58) Field of Classification Search
  CPC ......... H04N 13/344; H04N 2013/0081; H04N 13/128; H04N 13/111
  See application file for complete search history.

(56) References Cited

U.S. PATENT DOCUMENTS

| | | | |
|---|---|---|---|
| 2013/0169748 A1* | 7/2013 | Corral-Soto | H04N 13/111 348/43 |
| 2013/0176300 A1 | 7/2013 | Robert et al. | |
| 2013/0249904 A1 | 9/2013 | Kobayashi et al. | |
| 2013/0301906 A1* | 11/2013 | Yoon | G06T 17/00 382/154 |
| 2014/0293028 A1* | 10/2014 | Nguyen | H04N 13/305 348/59 |
| 2017/0276956 A1* | 9/2017 | Morifuji | G02B 27/0093 |
| 2018/0299952 A1* | 10/2018 | Koker | G06T 7/80 |
| 2019/0101758 A1* | 4/2019 | Zhu | G02B 27/0093 |
| 2019/0147220 A1 | 5/2019 | Mccormac et al. | |

OTHER PUBLICATIONS

International Search Report and Written Opinion for PCT/US2020/021663 dated Jun. 3, 2020; 15pgs.

* cited by examiner

SYSTEMS AND METHODS OF RENDERING REAL WORLD OBJECTS USING DEPTH INFORMATION

CROSS-REFERENCE TO RELATED APPLICATIONS

The present disclosure claims the benefit of and priority to U.S. Provisional Application No. 62/820,052, titled "SYSTEMS AND METHODS OF RENDERING REAL WORLD OBJECTS USING DEPTH INFORMATION," filed Mar. 18, 2019, the disclosure of which is incorporated herein by reference in its entirety.

BACKGROUND

The present disclosure relates generally to augmented reality (AR) systems. AR systems can be used to present various images, including three-dimensional (3D) images, to a user. For example, AR headsets can be used to present images to the user in a manner that is overlaid on a view of a real world environment. To render convincing, life-like AR images, the AR systems can provide objects or features at an appropriate depth in the image.

SUMMARY

An aspect of the present disclosure relates to a method. The method can include receiving, by a device, a first image from one or more cameras corresponding to a first view and a second image from the one or more cameras corresponding to a second view. The method can include providing, by the device, the first image and the second image to a motion estimator, the motion estimator determining first disparity offsets for the first image and second disparity offsets for the second image. The method can include generating, by the device for rendering a three-dimensional (3D) image using the first image and the second image, a first depth buffer for the first image derived from the first disparity offsets and a second depth buffer for the second image derived from the second disparity offsets.

Another aspect of the present disclosure relates to a system. The system can include a device and a graphics processing unit (GPU). The device can be configured to receive a first image from one or more cameras corresponding to a first view and a second image from the one or more cameras corresponding to a second view. The GPU can include a motion estimator and configured to receive the first image and the second image and be configured to receive the first image and the second image. The motion estimator can be configured to determine first disparity offsets for the first image and second disparity offsets for the second image. The device can be configured to generate, for rendering 3D image using the first image and the second image, a first depth buffer for the first image derived from the first disparity offsets and a second depth buffer for the second image derived from the second disparity offsets.

Another aspect of the present disclosure relates to a computer-readable medium that includes processor-executable instructions that when executed by one or more processors, cause the one or more processors to receive a first image from one or more cameras corresponding to a first view and a second image from the one or more cameras corresponding to a second view, provide the first image and the second image to a motion estimator, the motion estimator determining first disparity offsets for the first image and second disparity offsets for the second image, and generate for rendering a 3D image using the first image and the second image, a first depth buffer for the first image derived from the first disparity offsets and a second depth buffer for the second image derived from the second disparity offset.

Another aspect of the present disclosure relates to a method. The method includes receiving a first image from a first camera and a second camera. The first camera is disposed at a different location than the second camera. The method also includes determining first disparity offsets from a comparison of the first image and the second image, providing a first depth buffer using the first disparity offsets and the first image, determining second disparity offsets from a comparison of the second and the first image, and providing a second depth buffer using the second disparity offsets and the first image. The method also includes generating a first display image from the first image and the first depth buffer and a second display image from the second image and the second depth buffer in a compositor configured to provide a positional time warp operation.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
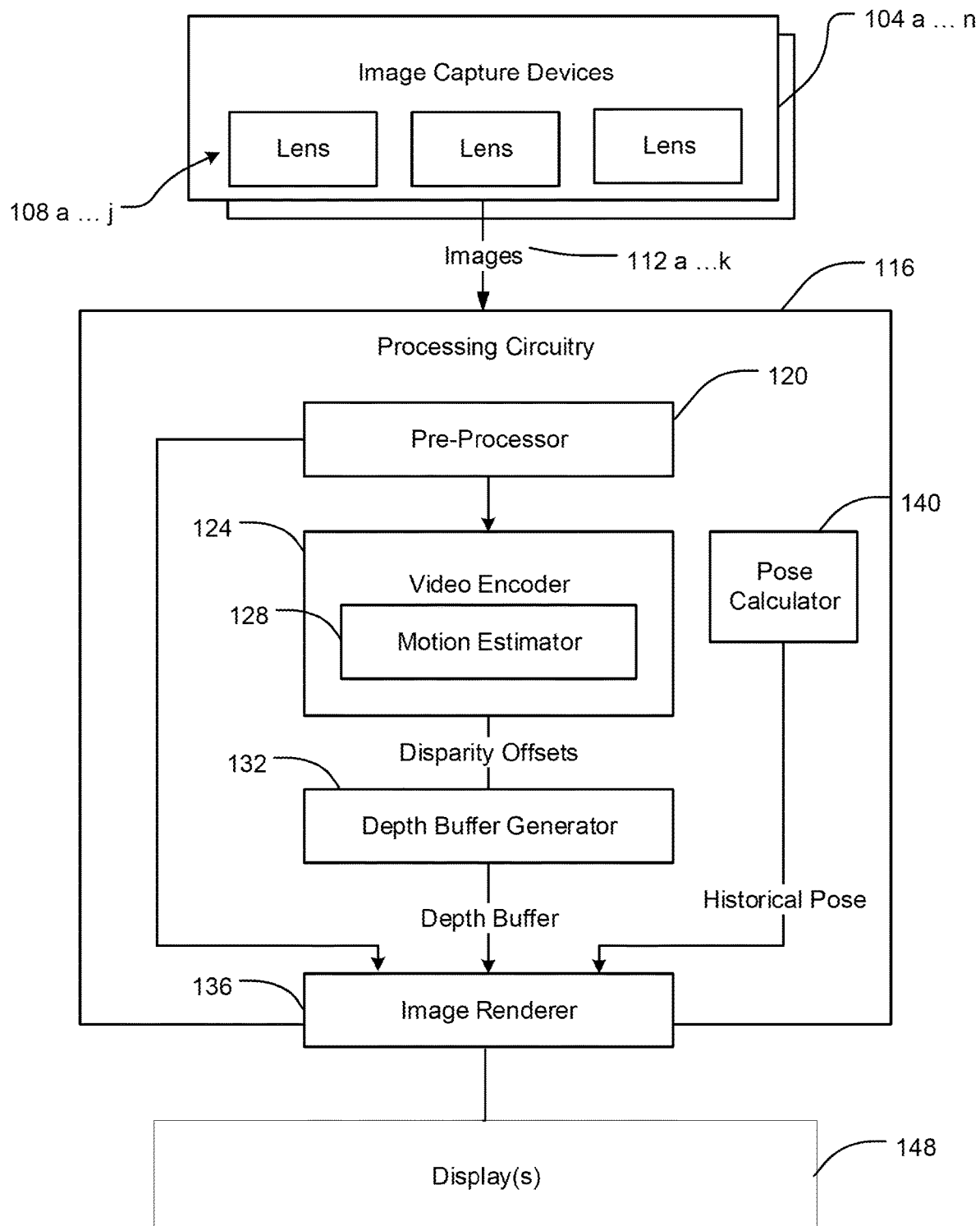
FIG. 1 is a block diagram of a display system according to an implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

AR systems can use an HMD (may also be referred to as a head-worn display (HWD)) to present images to a user at appropriate depth. The HMD can determine depth information for objects or features in a scene and render those objects and features at the determined depth (e.g., at least partially in response to the depth information). For example, the HMD can be used to present images that can be viewed stereoscopically, such as by sequentially or simultaneously presenting left eye images and right eye images, enabling a user to perceive a 3D environment. The HMD or the AR system can include one or more cameras that capture images from multiple perspectives, such as left eye and right eye images. In some embodiments, the HMD advantageously generates depth information regarding real world objects using the captured images with sufficient fidelity while also maintaining size, weight, and power (SWAP), along with latency, below desired benchmarks. In some embodiments, the HMD advantageously utilizes the video encoder of the graphics processor to extract the depth information or stereo correspondence without requiring additional hardware.

Systems and methods in accordance with certain aspects of the present solution can be used to generate images with an improved sense of depth for real world objects that are viewed while wearing the HMD, such as for AR systems. For example, the system can provide a first image of a first view and a second image of a second view captured by the one or more cameras to a motion estimator of a video encoder (e.g., a graphics processing unit (GPU) video encoder). The motion estimator can calculate first and second disparity offsets between the first image and the second image as if the motion estimator were calculating motion vectors between sequential images. The disparity offsets can be processed, filtered, and smoothed to remove artifacts. The system can generate first and second depth buffers respectively corresponding to the first and second disparity offsets, and then reproject the first and second images using the respective first and second depth buffers to generate display images that can be presented to the user to enable the user to perceive a 3D image. The system can calculate historical poses (e.g., 6 degree of freedom transforms) using timestamps of the images. The system can provide a layer including the images from the cameras (e.g., after rectification and cropping), the generated depth buffers, and the historical poses to a 3D renderer or compositor, which can perform positional time warp on the layer to reproject the images using the provided depth buffers.

The system can be used to calculate a better sense of depth for the real world objects that are viewed while wearing the HMD. For example, the system can analyze images provided by forward-facing camera pairs on the HMD and reproject the image contents to have more accurate parallax offset to match an interpupillary distance (IPD) of the user in some embodiments. The system can maintain desired performance characteristics throughout a processing pipeline, such as maintaining frame rates of at least 30 Hz. The system can rectify and crop the images received from the cameras while addressing distortions, such as fish-eye lens distortion, from the field of view of the cameras.

Referring now to FIG. 1, a system 100 can include a plurality of image capture devices 104$a$ . . . $n$, processing circuitry 116, and one or more displays 148. The system 100 can be implemented using the HMD system 200 described with reference to FIG. 2. The system 100 can be implemented using the computing environment described with reference to FIG. 4. The system 100 can incorporate features of and be used to implement features of virtual reality (VR) systems. At least some of the processing circuitry 116 can be implemented using a graphics processing unit (GPU). The functions of the processing circuitry 116 can be executed in a distributed manner using a plurality of processing units.

The processing circuitry 116 may include one or more circuits, processors, and/or hardware components. The processing circuitry 116 may implement any logic, functions or instructions to perform any of the operations described herein. The processing circuitry 116 can include any type and form of executable instructions executable by any of the circuits, processors or hardware components. The executable instructions may be of any type including applications, programs, services, tasks, scripts, libraries processes and/or firmware. Any of the pre-processor 120, video encoder 124, motion estimator 128, depth buffer generator 132, image renderer 136 and pose calculator 140 may be any combination or arrangement of circuitry and executable instructions to perform their respective functions and operations.

The image capture devices 104$a$ . . . $n$ can be cameras, including video cameras. The image capture devices 104$a$ . . . $n$ may be cameras that generate images of relatively low quality (e.g., relatively low sharpness, resolution, or dynamic range), which can help reduce the SWAP of the system 100. For example, the image capture devices 104$a$ . . . $n$ can generate images having resolutions on the order of hundreds of pixels by hundreds of pixels. At the same time, the processes executed by the system 100 as described herein can be used to generate display images for presentation to a user that have desired quality characteristics, including depth characteristics.

The image capture devices 104$a$ . . . $n$ (generally referred herein as image capture devices 104) can include any type of one or more cameras. The cameras can be visible light cameras (e.g., color or black and white), infrared cameras, or combinations thereof. The image capture devices 104$a$ . . . $n$ can each include one or more lenses 108 $a$ . . . $j$ generally referred herein as lens 108) of the one or more cameras 104. In some embodiments, the image capture device 104 can include a camera for each lens 108. In some embodiments, the image capture device 104 include a single camera with multiple lens 108 $a$ . . . $j$. In some embodiments, the image capture device 104 can include multiple cameras, each with multiple lenses 108. The one or more cameras of the image capture device 104 can be selected or designed to be a predetermined resolution and/or have a predetermined field of view. In some embodiments, the one or more cameras are selected and/or designed to have a resolution and field of view for tracking objects, such as in the field of view of a HMD for augmented reality. The one or more cameras may be used for multiple purposes, such as tracking objects in a scene or an environment captured by the image capture devices and performing the depth buffer generation techniques described herein. In some of these cases, the resolution and design of the image capture design may be suited for the tracking of objections and less suitable or otherwise not selected for depth buffer generation, and the depth buffer generation techniques of the present solution improve and overcome the lower quality camera(s) used for tracking objects. In some embodiments, the image capture devices 10$a$ . . . $n$ are inside out tracking cameras configured to provide images for head tracking operations. In some embodiments, the images for head tracking operations are also used to for depth buffer generation.

The one or more cameras of the image capture device 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

The system 100 can include a first image capture device 104a that includes a first lens 108a, the first image capture device 104a arranged to capture a first image 112a of a first view, and a second image capture device 104b that includes a second lens 108b, the second image capture device 104b arranged to capture a second image 112b of a second view. The first view and the second view may correspond to different perspectives, enabling depth information to be extracted from the first image 112a and second image 112b. For example, the first view may correspond to a left eye view, and the second view may correspond to a right eye view. The system 100 can include a third image capture device 104c that includes a third lens 108c, the third image capture device 104c arranged to capture a third image 112c of a third view. As described with reference to FIG. 2, the third view may correspond to a top view that is spaced from an axis between the first lens 108a and the second lens 108b, which can enable the system 100 to more effectively handle depth information that may be difficult to address with the first image capture device 104a and second image capture device 104b, such as edges (e.g., an edge of a table) that are substantially parallel to the axis between the first lens 108a and the second lens 108b.

Light of an image to be captured by the image capture devices 104a . . . n can be received through the one or more lenses 108 a . . . j. The image capture devices 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, the image capture devices 104a . . . n can use the sensor circuitry to generate the first image 112a corresponding to the first view and the second image 112b corresponding to the second view. The one or more image capture devices 104a . . . n can provide the images 112a . . . k to the processing circuitry 116. The one or more image capture devices 104a . . . n can provide the images 112a . . . k with a corresponding timestamp, which can facilitate synchronization of the images 112a . . . k when image processing is executed on the images 112a . . . k, such as to identify particular first the second images 112a, 112b representing first and second views and having the same timestamp that should be compared to one another to calculate depth information.

The processing circuitry 116 can include a pre-processor 120. The pre-processor 120 can modify the images 112a . . . k before further image processing is performed, such as before disparity offsets are calculated from the images 112a . . . k, including the first image 112a and the second image 112b. The pre-processor 120 can be used to remove distortions in the images 112a . . . k, such as fish-eye lens distortion. In some embodiments, the processing circuitry 116 is a graphics processing unit (GPU), and can execute the pre-processor 120 using the GPU.

The pre-processor 120 can rectify the images 112a . . . k received from the one or more image capture devices 104a . . . n. For example, the pre-processor 120 can transform each image 112a . . . k into a common image plane, such as by executing planar rectification, cylindrical rectification, or polar rectification. By rectifying the images 112a . . . k, the pre-processor 120 can transform the images 112a . . . k such that corresponding points in the images 112a . . . k have identical vertical coordinates. The pre-processor 120 can retrieve a predetermined position and orientation of each image capture device 104a . . . n maintained in memory of the processing circuitry 116, and rectify the images 112a . . . k based on the predetermined position and orientation. By rectifying the images 112a . . . k, the pre-processor 120 can facilitate the calculation of disparity offsets between the images 112a . . . k (e.g., as described below with reference to operation of the motion estimator 128).

The pre-processor 120 can crop the images 112a . . . k. For example, the pre-processor 120 identify a portion of each image 112 to crop, and output a cropped image 112 that does not include the identified portion. The pre-processor 120 can crop the images 112a . . . k to remove outer portions of the images 112a . . . k, such as portions in which distortions, such as fish-eye lens distortion, are more prevalent. The pre-processor 120 can identify the portion of each image 112 to crop based on a predetermined cropping scheme maintained in memory of the processing circuitry 116, such as a predetermined cropping scheme that identifies pixels of the images 112a . . . k to crop (e.g., pixels corresponding to a perimeter portion of the images 112a . . . k). The predetermined cropping scheme may be based on an expected distortion of the images 112a . . . k resulting from operation of the particular image capture devices 104a . . . n used to generate the images 112a . . . k. By cropping the images 112a . . . k, the pre-processor 120 can remove portions of the images 112a . . . k in which depth information may have relatively greater distortion as compared to the remaining portions of the images 112a . . . k.

The processing circuitry 116 can include a video encoder 124. The video encoder 124 can receive the first image 112a and second image 112b, such as by receiving the first image 112a and second image 112b responsive to pre-processing by the pre-processor 120. The video encoder 124 can encode the received images 112a . . . k, such as to convert the received images 112a . . . k to a predetermined format.

The video encoder 124 can convert the received images 112 to desired formats or specifications, such as resolutions, frame rates, and codecs. The video encoder 124 can use time stamps associated with the images 112 to synchronize first and second images 112a, 112b that correspond in time, such as by applying delays to one of the first image 112a or the second image 112b. The video encoder 124 can include a motion estimator 128. The motion estimator 128 can calculate motion vectors based on received images. For example, the motion estimator 128 can be implemented based on a motion estimator used to calculate motion vectors between image frames, such as in augmented reality (AR) and virtual reality (VR) systems. Although the motion estimator 128 is shown as part of the video encoder, the motion estimator 128 can be implemented as a separate component, such as a motion estimator hardware unit or executable instructions executing on the processing circuitry, such as a CPU or GPU.

The motion estimator 128 can use the motion vectors as disparity offsets. For example, the motion estimator 128 can calculate a first disparity offset by comparing the first image 112a to the second image 112b, such as by using the second image 112b as a baseline against which to compare the first image 112a. The motion estimator 128 can calculate a second disparity offset by comparing the second image 112b to the first image 112a, such as by using the first image 112a as a baseline against which to compare the second image 112b. The motion estimator 128 can select the first image 112a and the second image 112b for comparison based on the first image 112a and the second image 112b having an identical timestamp (or having timestamps within a threshold time difference of each other, such as a threshold difference on an order of a frame rate at which the images 112a . . . k are provided from the image capture devices 104a . . . n). In some embodiments, the first image is from a first camera of the image capture devices 104a . . . n, and the second image is from a second camera of the image capture devices 104a . . . n. The first and second images 112a, 112b can be captured at the same time or at nearly the same time and the first camera 104a has a first view point or location and the second camera 104b has a second view point or locations in some embodiments. The difference in locations or viewpoints is a known value in some embodiments.

The first and second disparity offsets can be stereo disparity offsets, such as to indicate differences in perspective between the first view corresponding to the first image and the second view corresponding to the second image which can be used to provide depth information. For example, the first and second disparity offsets can correspond to the first and second views that correspond to stereographic or stereoscopic views of a 3D image to be perceived by a user.

The motion estimator 128 can calculate the first disparity offset and the second disparity offset by comparing corresponding elements of the first image 112a and the second image 112b. The elements of the images 112a . . . k can include individual pixels, groups of pixels, or features represented by groups of pixels, such as objects. For example, the motion estimator 128 can execute a feature recognition algorithm (e.g., object recognition algorithms, edge detection, corner detection, etc.) to identify a feature represented by one or more pixels, and calculate the first disparity offset by comparing one or more first pixels representing the feature in the first image 112a to one or more second pixels representing the feature in the second image 112b. The pixels can represent a real world object, structure, body part, computer equipment, etc. in the scene. Corresponding features in each of the images can be determined based upon similar size, shapes, gray scale intensities, and colors in some embodiments. The motion estimator 128 can assign the disparity offset to the pixel(s) for which the disparity offset is calculated.

The motion estimator 128 can generate the first disparity offset to indicate a difference in pixels in one or more dimensions represented in the arrangements of the pixels of the first image 112a and the second image 112b. For example, if the first image 112a and second image 112b are arranged in an x-y coordinate system, a first pixel of the first image 112a has a first coordinate of [3, 6], and a second pixel of the second image 112b corresponding to the first pixel has a second coordinate of [4, 7], the motion estimator 128 can generate the first disparity offset as a vector [−1, −1], such as by subtracting the second coordinate from the first coordinate. The motion estimator 128 can generate the second disparity offset as a vector [1, 1], such as by subtracting the first coordinate from the second coordinate. The disparity offsets can be determined as absolute values (e.g., absolute differences between elements, positions, and/or pixels). The motion estimator 128 can generate the first disparity offset to indicate an angle and a distance from the first pixel to the corresponding second pixel, and can generate the second disparity offset to indicate an angle and a distance from the second pixel to the corresponding first pixel.

Where the elements of the images 112a, 112b include multiple first pixels of the first image 112a and multiple second pixels of the second image 112b, the motion estimator 128 can generate the first disparity offset to include one or more vectors (or angle and distance values) corresponding to comparing each first pixel to each corresponding second pixel, or comparing one or more representative first pixels to one or more representative second pixels. The motion estimator 128 can identify the representative first pixel(s) and the representative second pixel(s) by executing various functions, including but not limited to calculating a centroid of the pixels, identifying corner pixels, or identifying edge pixels.

The video encoder 124 can remove artifacts from the disparity offsets. For example, the video encoder 124 can execute various filters, such as spatial filters, or smoothing algorithms to remove undesired artifacts.

The processing circuitry 116 can include a depth buffer generator 132. The depth buffer generator 132 can receive the disparity offsets from the video encoder 124, and generate depth buffers (e.g., depth maps) for each image based on the disparity offsets. For example, the depth buffer generator 132 can generate a first depth buffer based on the first disparity offsets for the first image 112a, and generate a second depth buffer based on the second disparity offsets for the second image 112b. The depth buffer generator 132 can generate the depth buffers to have a relatively low number of pixels (e.g., 80 by 60 pixels relatively to an image size of the images 112a . . . k that may be on the order of a few hundred pixels by a few hundred pixels).

The depth buffer generator 132 can generate the depth buffers based on information regarding the image capture devices 104a . . . n used to capture the images 112a . . . k and the disparity offsets. For example, the depth buffer generator 132 can generate the first depth buffer by calculating depth values based on the first disparity offsets, a baseline distance between the first lens 108a via which the first image 112a was captured and the second lens 108b via which the second image 112b was captured, and a focal length of the first lens 108a. The depth buffer generator 132 can generate the first depth buffer by assigning a depth value to at least one corresponding pixel of the first image 112a, and the second depth buffer by assigning a depth value to at least one corresponding pixel of the second image 112b. For example, the depth buffer generator 132 can generate the first depth buffer as a matrix of pixels corresponding to the pixels of the first image 112a, each first depth buffer pixel having an assigned depth value. The depth buffer generator 132 can generate the depth buffers to have a lesser resolution than the images 112a . . . k.

The processing circuitry 116 can include a pose calculator 140. The pose calculator 140 can identify, determine or calculate one or more poses from a history of poses processed, managed or stored via the processing circuitry 116. A pose can be any type and form of data to electronically represent a scene or view captured by the image capture device 104. The pose may identify the view of an object, scene or environment viewable via one or more cameras of an HMD based at least on the position or orientation in space of the HMD on a wearer. The data for a pose may include or identify from a 6 degrees of freedom (6Dof) perspective of the view from HMD at a current instance of time. The data for a pose may include image data for rendering any one or more objects in the scene, view or environment based at least on a perspective of the HMD wearer, position, orientation and time. The pose may include a 6Dof transform representing translations and orientation of one or more objects of a scene, view or environment at an instance of time based on the position and orientation of the HMD. The processing circuitry 116 may store a history of poses based on time, using time stamps for instance, in memory or storage.

The image data from the history of poses can be used by the image renderer 136 for rendering display images based on the images 112 captured by the image capture devices 104. The pose calculator 140 may use the time stamps of any images captured by the image capture device 104 and obtained, received or provided to the processing circuitry 116 to identify any one or more historical poses useful for 3D rendering process, such as by providing image data from a 6Dof perspective based on a position and orientation of the HMD with respect to one or more objects, a scene or an environment. The pose calculator 140 may select one or more poses based on one or more of the timestamps of the captured images and/or poses, the position and orientation of the HMD with respect to the pose and/or the objects in the view or scene, and the quality and/or resolution of any associated image data. The pose calculator 140 may compute, generate or calculate any one or more poses from any image data previously captured, including portions of the data or transformations of the data into 6Dof representations, such as any image data related to the images captured by the image capture devices 104 for display by the image renderer 136 via the display 148.

The processing circuitry 116 can include an image renderer 136. The image renderer 136 can be a 3D image renderer. The image renderer 136 may use image related input data to process, generate and render display or presentation images to display or present on one or more display devices, such as via an HMD. The image renderer 136 can generate or create 2D images of a scene or view for display on display 148 and representing the scene or view in a 3D manner. The display or presentation data to be rendered can include geometric models of 3D objects in the scene or view. The image renderer 136 may determine, compute or calculate the pixel values of the display or image data to be rendered to provide the desired or predetermined 3D image(s), such as 3D display data for the images 112 captured by the image capture device 104. The image renderer 136 can receive the images (e.g., receive pre-processed images from the pre-processor 120) and the depth buffers from the depth buffer generator 132, and generate display images using the images and the depth buffers. The image renderer 136 can use the images and the depth buffers and poses computed from the pose calculator 140 to generate display images to be presented or displayed via the displays 148.

The image renderer 136 can render frames of display data to one or more displays based on temporal and/or spatial parameters. The image renderer 136 can render frames of image data sequentially in time, such as corresponding to times at which images are captured by the image capture devices 104. The image renderer 136 can render frames of display data based on changes in position and/or orientation to the image capture devices 104, such as the position and orientation of the HMD. The image renderer 136 can render frames of display data based on left-eye view(s) and right-eye view(s) such as displaying a left-eye view followed by a right-eye view or vice-versa.

The image renderer 136 can use re-projection or frame-rate smoothing techniques to reduce computation (CPU/GPU) processing time or requirements while generating display data of desired quality or corresponding to quality if generated from the image processing pipeline. Reprojecting is a technique can modify the display data to be rendered before sending to the display 148 to correct or adjust for head or HMD movement that occurred after the image data has been captured. This modification of the display data may be referred to as warping. Reprojecting can correct or adjust for positional movement in the HMD or view of the wearer of the HMD, referred to as asynchronous timewarp. Reprojecting can correct or adjust for positional and rotational movement in the HMD or view of the wearer of the HMD, referred to as position time warp (PSW). In reprojecting, the image renderer 136 may extrapolate from any of the inputs, such as the pre-processed image data, depth buffers and poses, to account for the positional and/or rotational movement that occurred in the HMD after the instance or time of capturing the image data and before rendering the display data to the display 148.

The image renderer 136 can receive the images 112$a$ . . . $k$ (e.g., receive pre-processed images 112$a$ . . . $k$ from the pre-processor 120) and the depth buffers from the depth buffer generator 132. For example, the image renderer 136 can receive the images 112$a$ . . . $k$, the corresponding depth buffers, and corresponding historical poses as an input layer. The image renderer 136 can generate display images using the images and the depth buffers (and the historical poses). For example, the image renderer 136 can generate a first display image using the first image 112$a$ and the first depth buffer, and a second display image using the second image 112$b$ and the second depth buffer. The image renderer 136 can be implemented using an image compositor.

The image renderer 136 can generate the display images by reprojecting the images 112$a$ . . . $k$ using the corresponding depth buffers. For example, the image renderer 136 can reproject the images 112$a$ . . . $k$ to position the images 112$a$ . . . $k$ in a correct image space or an image space that a user of the HMD is expected to perceive when the display images are displayed. The image renderer 136 can reproject the images 112$a$ . . . $k$ using a camera matrix corresponding to the one or more image capture devices 104 that maps information from three-dimensional space (e.g., using the images 112$a$ . . . $k$ and the depth buffers) to two-dimensional space (e.g., the display images). The image renderer 136 can determine the camera matrix based on characteristics of the one or more image capture devices 104, such as focal length. In some embodiments, the image renderer 136 reprojects the images 112$a$ . . . $k$ by projecting the images 112$a$ . . . $k$, along with the depth buffers, three-dimensional space to two-dimensional space, including using the motion data regarding the HMD to identify a corresponding perspective of the display images as compared to a perspective of the images 112$a$ . . . $k$. The image renderer 136 can reproject the images 112$a$ . . . $k$ using various algorithms, such as asynchronous reprojection algorithms, which can use information such as rotational tracking of the head, camera translation, and head translation to determine how to reproject the display images.

The image renderer 136 can reproject the images 112$a$ . . . $k$ by executing a positional time warp (PTW) algorithm. For example, the image renderer 136 can identify a first pixel of the first image 112$a$, identify a corresponding first depth value of the first depth buffer, and adjust a first display pixel used to present the information of the first pixel of the first image 112$a$ in the first display image. For example, the image renderer 136 can locate the first display pixel in a different location (e.g., different pixel coordinates) than the first pixel based on the first depth value. The image renderer 136 can execute the PTW algorithm on the layer including images 112$a$ . . . $k$, the corresponding depth buffers, and corresponding historical poses.

The image renderer 136 can generate the display images using motion data regarding movement of the image capture devices 104$a$ . . . $n$ that captured the images 112$a$ . . . $k$. For example, image capture devices 104$a$ . . . $n$ may change in at least one of position or orientation due to movement of a head of the user wearing an HMD that includes the image capture devices 104a . . . n (e.g., as described with reference to HMD system 200 of FIG. 2). The processing circuitry 116 can receive the motion data from a position sensor (e.g., position sensor 220 described with reference to FIG. 2). The image renderer 136 can use the motion data to calculate a change in at least one of position or orientation between a first point in time at which the images 112a . . . k were captured and a second point in time at which the display images will be displayed, and generate the display images using the calculated change. The image renderer 136 can use the motion data to interpolate and/or extrapolate the display images relative to the images 112a . . . k.

Although the image renderer is shown as part of the processing circuitry 116, the image renderer may be formed as part of other processing circuitry of a separate device or component, such as the display device, for example within the HMD.

Any of the pre-processor 120, video encoder 124, or image renderer 136 may utilize data from image captures, pre-processed images and/or poses to correct, adjust or modify depth buffer, pre-processed images or display data to be rendered to improved details, quality of resolution of the image. For the example, the image capture device(s) 104 and the processing circuitry 116 may obtain and process images of different resolutions and quality over time and use data from such images to fill in details for images currently being processed. For example, resolution and quality can be adjusted according to the amount of available processing power or mega instructions per second (MIPS).

Components of the processing circuitry 116, such as the video encoder 124, motion estimator 128, depth buffer generator 132 and the image renderer 136, can independently process the first image 112a and the second image 112b. For example, subsequent to the motion estimator 128 using the second image 112b as the baseline for calculating the first disparity offsets of the first image 112a and the first image 112a as the baseline for calculating the second disparity offsets of the second image 112b, the processing circuitry 116 can separately generate downstream parameters and data objects such as the first and second depth buffers and the first and second display images. This can enable the processing circuitry 116 to handle situations in which the motion vectors and depth buffers are not symmetric (e.g., the first disparity offsets are not equivalent to a version of the second disparity offsets in which the second disparity offsets shifted due to the distance between corresponding elements and have signs reversed due to the opposite directions in which the disparity offsets are calculated), due to disocclusions or other factors, as the processing circuitry 116 can avoid correlating or fusing depth buffers and other parameters. By independently processing the first image 112a and the second image 112b, the processing circuitry 116 can reduce processing cycles as information may not be needed to be reprojected or rewarped from the image space of the first view (e.g., first eye) to the image space of the second view (e.g., second eye) or vice versa.

The system 100 can include one or more displays 148. The one or more displays 148 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the leans within the frame of the glasses or goggles. The displays 148 may have a refresh rate the same or different than a rate of refresh or frame rate of the processing circuitry 116 or the image renderer 136 or the image capture devices 104a . . . n.

Figure 2:
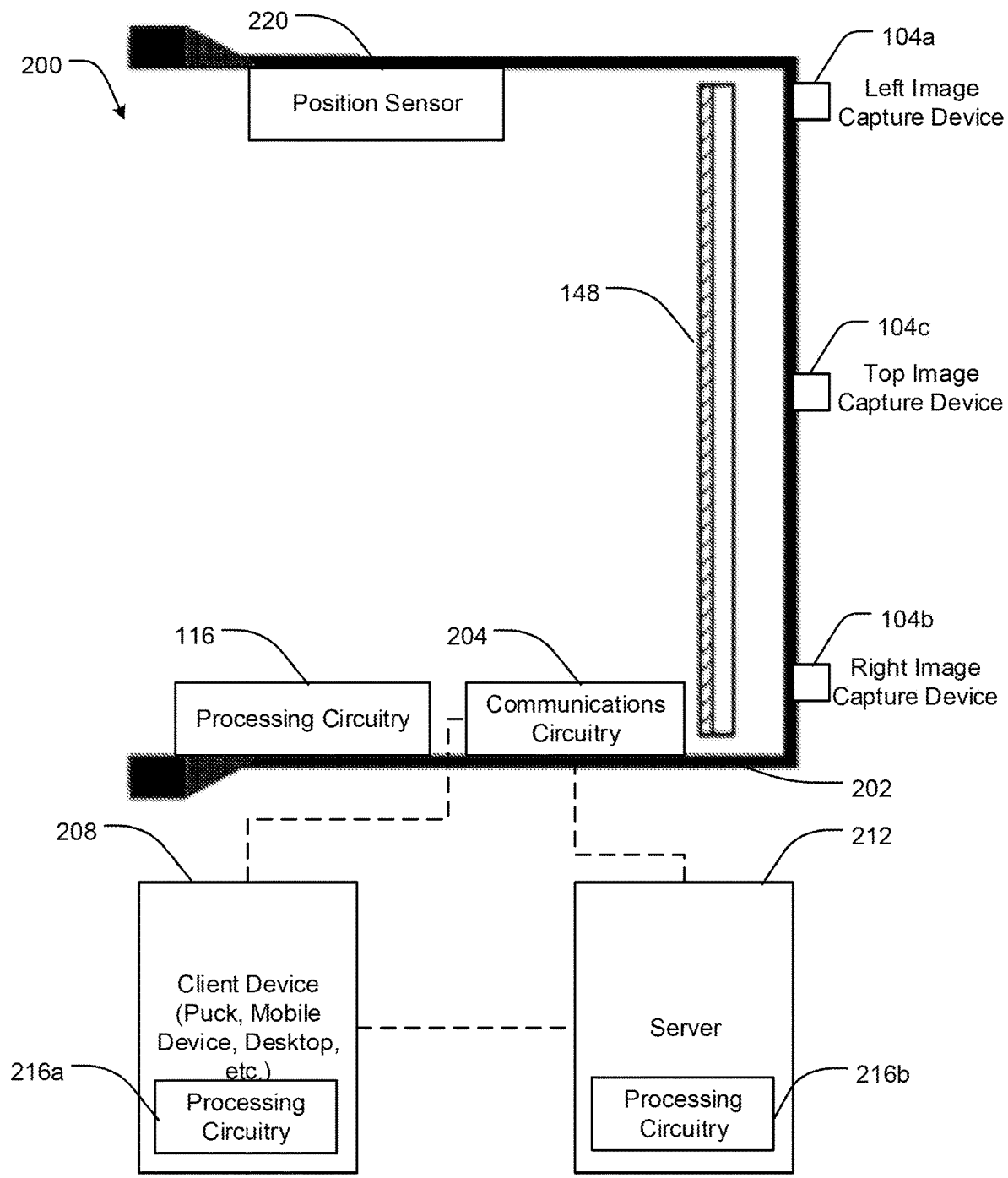
FIG. 2 is a schematic diagram of a head-mounted display (HMD) system according to an implementation of the present disclosure.

Referring now to FIG. 2, an HMD system 200 can include an HMD body 202, a left image capture device 104a, a right image capture device 104b, and the display 148. The HMD body 202 can have various form factors, such as glasses or a headset. The image capture devices 104a, 104b can be mounted to or integrated in the HMD body 202. The left image capture device 104a can capture first images corresponding to a first view (e.g., left eye view), and the right image capture device 104b can capture images corresponding to a second view (e.g., right eye view).

The HMD system 200 can include a top image capture device 104c. The top image capture device 104c can capture images corresponding to a third view different than the first view or the second view. For example, the top image capture device 104c can be positioned between the left image capture device 104a and right image capture device 104b and above a baseline between the left image capture device 104a and right image capture device 104b. This can enable the top image capture device 104c to capture images with depth information that may not be readily available to be extracted from the images captured by the left and right image capture devices 104a, 104b. For example, it may be difficult for depth information to be effectively extracted from images captured by the left and right image capture devices 104a, 104b in which edges (e.g., an edge of a table) are parallel to a baseline between the left and right image capture devices 104a, 104b. The top image capture device 104c, being spaced from the baseline, can capture the third image to have a different perspective, and thus enable different depth information to be extracted from the third image, than the left and right image capture devices 104a, 104b.

The HMD system 200 can include processing circuitry 116, which can perform at least some of the functions described with reference to FIG. 1, including receiving images from the image capture devices 104a, 104b, and 104c, and processing the received images to generate depth buffers for rendering a 3D image using the received images.

The HMD system 200 can include communications circuitry 204. The communications circuitry 204 can be used to transmit electronic communication signals to and receive electronic communication signals from at least one of a client device 208 or a server 212. The communications circuitry 204 can include wired or wireless interfaces (e.g., jacks, antennas, transmitters, receivers, transceivers, wire terminals) for conducting data communications with various systems, devices, or networks. For example, the communications circuitry 204 can include an Ethernet card and port for sending and receiving data via an Ethernet-based communications network. The communications circuitry 204 can communicate via local area networks (e.g., a building LAN), wide area networks (e.g., the Internet, a cellular network), and/or conduct direct communications (e.g., NFC, Bluetooth). The communications circuitry 204 can conduct wired and/or wireless communications. For example, the communications circuitry 204 can include one or more wireless transceivers (e.g., a Wi-Fi transceiver, a Bluetooth transceiver, a NFC transceiver, a cellular transceiver). For example, the communications circuitry 204 can establish wired or wireless connections with the at least one of the client device 208 or the server 212. The communications circuitry 204 can establish a USB connection with the client device 208.

The HMD system 200 can be deployed using different architectures. In some embodiments, the HMD (e.g., HMD body 202 and components attached to the HMD body 202) comprises the processing circuitry 116 and is self-contained portable unit. In some embodiments, the HMD has portions of the processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of the processing circuitry 116 that work in cooperation with or in conjunction with processing circuitry, or portions thereof, of a desktop computing device. In some embodiments, the HMD has portions of the processing circuitry that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as image capture and rendering to the display 148. The HMD can transmit and receive data with the client device 108 to leverage the client device 108's computing power and resources which may have higher specifications than those of the HMD.

The server 212 can be any type of form of computing device that provides applications, functionality or services to one or more client devices 208 or other devices acting as clients. In some embodiments, the server 212 can be a client device 208. The server 212 can be deployed in a data center or cloud computing environment accessible via one or more networks. The HMD and/or client device 208 can use and leverage the computing power and resources of the server 212. The HMD and/or client device 208 can implement any portion of the image and rendering processing pipeline described in connection with FIGS. 1 and 3. The server 212 can implement any portion of the image and rendering processing pipeline described in connection with FIGS. 1 and 3, and in some cases, any portions of the image and rendering processing pipeline not performed by client device 208 or HMD. The server 212 may be used to update the HMD and/or client device 208 with any updated to the applications, software, executable instructions and/or data on the HMD and/or client device 208.

The system 200 can include a position sensor 220. The position sensor 220 can output at least one of a position or an orientation of the body 202. As the image capture devices 104a, 104b, 104c can be fixed to the body 202 (e.g., at predetermined locations relative to the position sensor 220), the position sensor 220 can output at least one of a position or an orientation of each image capture device 104a, 104b, 104c. The position sensor 220 can include at least one of an inertial measurement unit (IMU), an accelerometer, a gyroscope, or a magnetometer (e.g., magnetic compass).

Figure 3:
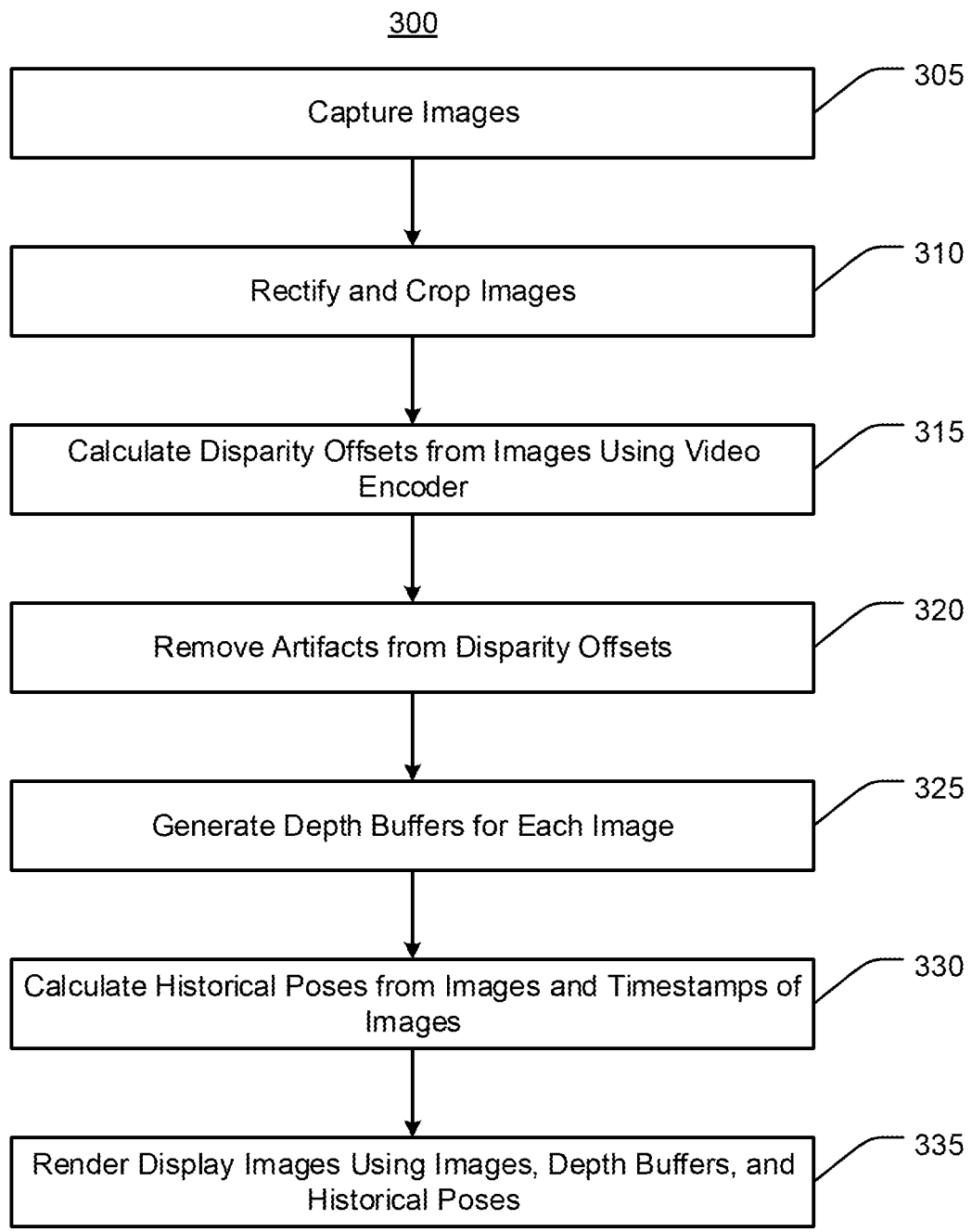
FIG. 3 is a flow diagram of a method of depth buffer generation from images using a motion estimator according to an implementation of the present disclosure.

Referring now to FIG. 3, a method 300 can include one or more of the following steps. The method 300 can include capturing images by one or more image capture devices (305). The method can include pre-processing the images (310). The method 300 can include determining disparity offsets for the images (315). The method 300 can include removing artifacts from the images (320). The method can include generating depth buffers for each image (325). The method can include calculating historical poses (330). The method can include rendering display images (335). The method 300 can be executed using various devices and systems described herein, including the system 100, the processing circuitry 116, and the system 200. The method 300 can be performed to independently or separately determine parameters such as disparity offsets (e.g., motion vectors) and depth buffers for each image, which can avoid image errors that would result from disocclusions and can reduce processing requirements.

At 305, images are captured by one or more image capture devices. The images can be captured by receiving light via a lens at a sensor, and using the sensor to generate an image based on the received light, such as by generating an image representing the received light through a field of view of the lens as a data structure of pixels. The images can be captured continuously. The images can be captured at a predetermined frame rate. A first image can be captured at a first frame rate, and a second image can be captured at a second frame rate, which may be different than the first frame rate. One or more cameras can capture the first image, which may correspond to a first view and the second image, which may correspond to a second view. The images can be video images. The images can be captured at various frame rates. The one or more cameras can include lens(es) through which light is received to generate the images, such as by using image sensors. The one or more cameras may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking. The cameras can provide the images with a corresponding timestamp, which can facilitate synchronization of the images when image processing is executed on the images, such as to identify particular first the second images representing first and second views and having the same timestamp that should be compared to one another to calculate depth information.

At 310, the images may be pre-processed to prepare the images for various processing algorithms. Distortions in the image, such as fish-eye lens distortions, can be removed. For example, the first image and the second image can be rectified, such as by transforming the first and second image into a common image plane.

The first image and the second image can be cropped. A portion of each image to crop can be identified, and a cropped image can be outputted that does not include the identified portion. The images can be cropped to remove outer portions of the images, such as portions in which distortions, such as fish-eye lens distortion, are more prevalent. The portion of each image to crop can be identified based on a predetermined cropping scheme that identifies pixels of the images to crop (e.g., pixels corresponding to a perimeter portion of the images). The predetermined cropping scheme may be based on an expected distortion of the images resulting from operation of the particular image capture devices used to generate the images.

At 315, disparity offsets can be determined for the images. The disparity offsets can be determined using a motion estimator of a video encoder, which may be executed using a GPU. For example, first disparity offsets can be determined for the first image and second disparity offsets can be determined for the second image. The first disparity offsets can be calculated by comparing the first image to the second image, using the second image as a baseline. The second disparity offsets can be calculated by comparing the second image to the first image, using the first image as a baseline. The first and second disparity offsets can be stereo disparity offsets, such as to indicate differences in perspective between the first view corresponding to the first image and the second view corresponding to the second image which can be used to provide depth information. For example, the first and second disparity offsets can correspond to the first and second views that correspond to stereographic or stereoscopic views of a 3D image to be perceived by a user. The first disparity offset and the second disparity offset can be calculated by comparing corresponding elements of the first image and the second image. The elements of the images can include individual pixels, groups of pixels, or features represented by groups of pixels, such as objects. For example, a feature recognition algorithm (e.g., object recognition algorithms, edge detection, corner detection, etc.) can be executed to identify a feature represented by one or more pixels, and the first disparity offset can be calculated by comparing one or more first pixels representing the feature in the first image to one or more second pixels representing the feature in the second image. The disparity offset can be assigned to the pixel(s) for which the disparity offset is calculated. The disparity offsets can be generated to indicate a difference in pixels in one or more dimensions represented in the arrangements of the pixels of images. For example, the disparity offsets can be represented as vectors in a coordinate scheme corresponding to the images (e.g., x-y coordinates). The disparity offsets can be represented as angle and distance values. The disparity offsets can be provided as absolute values (e.g., absolute differences between elements, positions, and/or pixels). Where the elements of the images include multiple first pixels of the first image and multiple second pixels of the second image, the first disparity offset can be generated to include one or more vectors (or angle and distance values) corresponding to comparing each first pixel to each corresponding second pixel, or comparing one or more representative first pixels to one or more representative second pixels.

At 320, artifacts may be removed from the disparity offsets. For example, various filters, such as spatial filters, or smoothing algorithms, can be executed to remove undesired artifacts.

At 325, depth buffers (e.g., depth maps) can be generated for each image. Depth buffers can be generated based on the disparity offsets. For example, a first depth buffer can be generated based on the first disparity offsets for the first image, and a second depth buffer can be generated based on the second disparity offsets for the second image. The depth buffers based on information regarding the image capture devices used to capture the images and the disparity offsets. For example, the first depth buffer can be determined by calculating depth values based on the first disparity offsets, a baseline distance between the first lens via which the first image was captured and the second lens via which the second image was captured, and a focal length of the first lens. The depth buffers can be generated as a matrix of pixels each having a depth value corresponding to at least one pixel of the images for which the depth buffers are generated.

At 330, historical poses can be calculated. A pose can be any type and form of data to electronically represent a scene or view captured by the image capture device. The pose may identify the view of an object, scene or environment viewable via one or more cameras of an HMD based at least on the position or orientation in space of the HMD on a wearer. The data for a pose may include or identify from a 6 degrees of freedom (6Dof) perspective of the view from HMD at a current instance of time. The data for a pose may include image data for rendering any one or more objects in the scene, view or environment based at least on a perspective of the HMD wearer, position, orientation and time.

At 335, display images can be rendered using the images, the depth buffers, and the historical poses. The display images can be rendered using an image renderer, such as a 3D renderer or a compositor. Frames of display data can be rendered and provided to one or more displays based on temporal and/or spatial parameters. Frames of display data can be rendered based on left-eye view(s) and right-eye view(s) such as displaying a left-eye view followed by a right-eye view or vice-versa, or simultaneously displaying left-eye and right-eye views. The display images can be rendered using reprojection, such as to position the display images in a correct image space. The display images can be reprojected by executing a PTW algorithm. For example, a first pixel of the first image can be identified, a corresponding first depth value of the first depth buffer can be identified, and a first display pixel can be adjusted used to present the information of the first pixel of the first image in the first display image. The PTW algorithm can be executed on a layer including the images, the corresponding depth buffers, and corresponding historical poses. The display images can be rendered using motion data regarding movement of the image capture devices. For example, motion data received from a position sensor can be used to account for a change in at least one of a position or an orientation of the HMD resulting from head movement. The display images can be rendered at various rates, which may be different than a rate at which images are received from the one or more cameras. The display images can be rendered at a rate corresponding to a movement rate of the one or more cameras, such as to increase a rate of display image rendering as the movement rate increases, which may facilitate reducing motion blur (e.g., by interpolating more frames between frames corresponding to images received from the one or more cameras). In some embodiments, the display images are rendered to interpolate or extrapolate relative to the images received from the one or more cameras. For example, a first reprojection can be executed to generate a first display image (corresponding to the first image) and a second display image (corresponding to the second image). Responsive to generating the first display image and the second display image, a time until which new images are expected to be received (and processed in order to generate the disparity offsets) can be compared to a time threshold, and responsive to the time meeting or exceeding the time threshold, a second reprojection can be executed to generate a third display image (corresponding to the first display image) and a fourth display image (corresponding to the second display image), enabling additional frames to be displayed while additional real world images are being received and processed. The rendered display images can be presented using various displays, such as the HMD.

Figure 4:
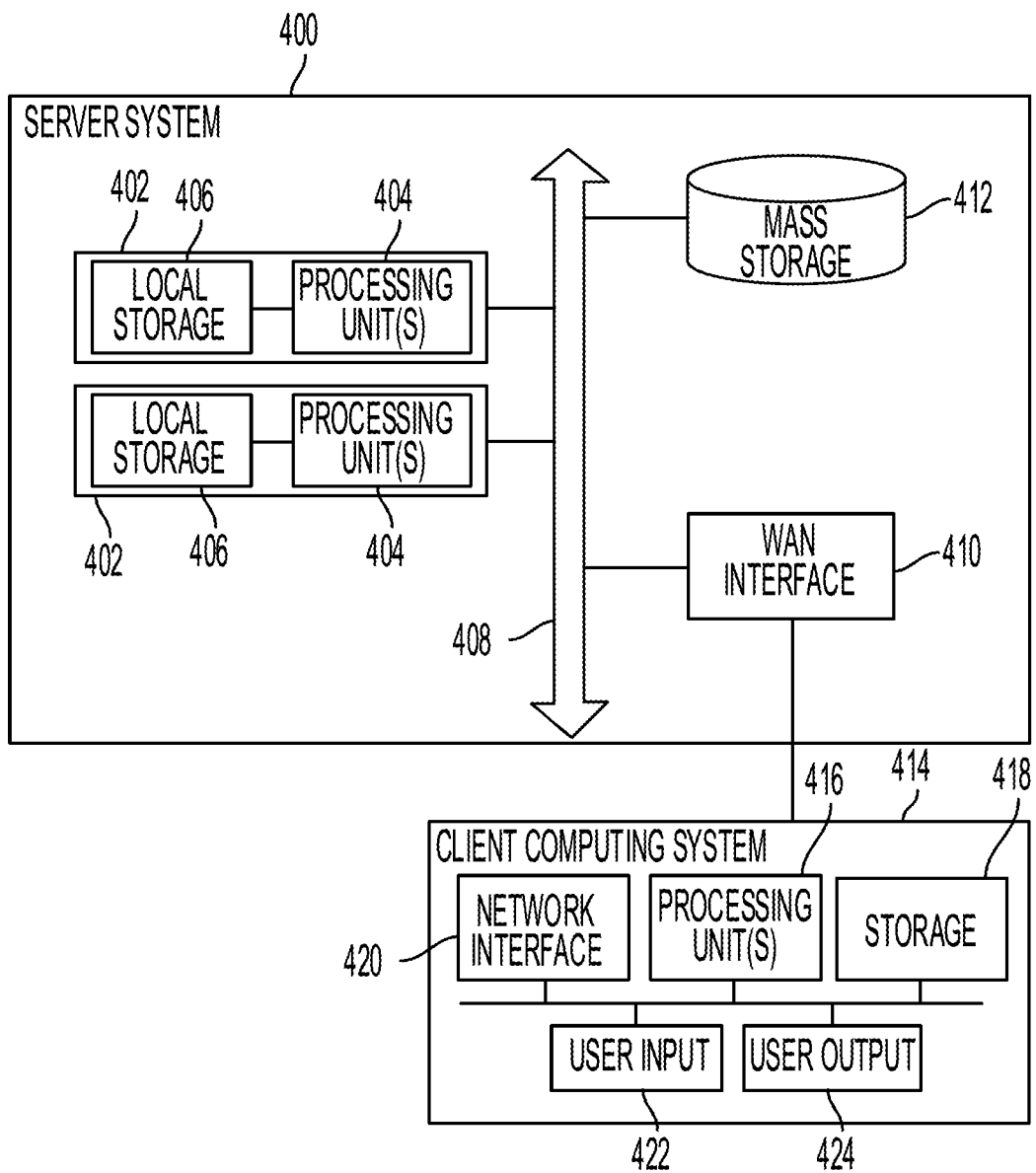
FIG. 4 is a block diagram of a computing environment according to an implementation of the present disclosure.

Various operations described herein can be implemented on computer systems. FIG. 4 shows a block diagram of a representative server system 400 and client computer system 414 usable to implement the present disclosure. Server system 400 or similar systems can implement services or servers described herein or portions thereof. Client computer system 414 or similar systems can implement clients described herein. Each of the systems 100, 200 and others described herein can incorporate features of the systems 400, 414.

Server system 400 can have a modular design that incorporates a number of modules 402 (e.g., blades in a blade server); while two modules 402 are shown, any number can be provided. Each module 402 can include processing unit(s) 404 and local storage 406.

Processing unit(s) 404 can include a single processor, which can have one or more cores, or multiple processors. Processing unit(s) 404 can include a general-purpose primary processor as well as one or more special-purpose co-processors such as graphics processors, digital signal processors, or the like. Some or all processing units 404 can be implemented using customized circuits, such as application specific integrated circuits (ASICs) or field programmable gate arrays (FPGAs). Such integrated circuits execute instructions that are stored on the circuit itself. Processing unit(s) 404 can execute instructions stored in local storage 406. Any type of processors in any combination can be included in processing unit(s) 404.

Local storage 406 can include volatile storage media (e.g., conventional DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 406 can store one or more software programs to be executed by processing unit(s) 404, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 406 can provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. Additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Conventional work allocation techniques can be used. As requests are processed, results can be returned to the requester via WAN interface 410. Such operation can generally be automated. WAN interface 410 can connect multiple server systems 400 to each other, providing scalable systems capable of managing high volumes of activity. Conventional or other techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include conventional computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to a wide area network (e.g., the Internet) to which WAN interface 410 of server system 400 is also connected. Network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
receiving, by a device, a first image from one or more cameras corresponding to a first view and a second image from the one or more cameras corresponding to a second view;
providing, by the device, the first image and the second image to a motion estimator, the motion estimator determining first disparity offsets for the first image and second disparity offsets for the second image; and
generating, by the device for rendering a three-dimensional (3D) image using the first image, the second image, and a change in at least one of position or orientation from detecting the first image to displaying the 3D image determined from motion data of the one or more cameras, a first depth buffer for the first image derived from the first disparity offsets and a second depth buffer for the second image derived from the second disparity offsets.

2. The method of claim 1, further comprising providing, by the device, the first depth buffer, the first image, the second depth buffer and the second image as image input to a 3D renderer to display one or more 3D images on one or more displays.

3. The method of claim 2, further comprising reprojecting, by the 3D renderer, a first display image corresponding to the first image using the first depth buffer for presentation by a first display and a second display image corresponding to the second image using the second depth buffer for presentation by a second display.

4. The method of claim 2, further comprising determining, by the device, one or more historical poses of one or more elements of a scene corresponding to the first image and the second image based at least on a first timestamp of the first image or a second timestamp of the second image and providing the one or more historical poses to the 3D renderer for generating the one or more 3D images.

5. The method of claim 1, further comprising rectifying, by the device, one of the first image or the second image.

6. The method of claim 1, further comprising one of filtering or smoothing one or more of the first disparity offsets or the second disparity offsets.

7. The method of claim 1, further comprising processing, by the device, one of the first disparity offsets or the second disparity offsets outputted from the motion estimator to remove one or more artifacts.

8. The method of claim 1, further comprising determining, by the motion estimator, the first disparity offsets by comparing the first image to the second image and the second disparity offsets by comparing the second image to the first image.

9. A system, comprising:
a device configured to receive a first image from one or more cameras corresponding to a first view and a second image from the one or more cameras corresponding to a second view;
a graphics processing unit comprising a motion estimator and configured to receive the first image and the second image;
wherein the motion estimator is configured to determine first disparity offsets for the first image and second disparity offsets for the second image; and
wherein the device is configured to generate, for rendering a three-dimensional (3D) image using the first image, the second image, and a change in at least one of position or orientation from detecting the first image to displaying the 3D image determined from motion data of the one or more cameras, a first depth buffer for the first image derived from the first disparity offsets and a second depth buffer for the second image derived from the second disparity offsets.

10. The system of claim 9, wherein the device is configured to reproject the first image using the first depth buffer and the second image using the second depth buffer to generate a first display image and a second display image.

11. The system of claim 9, wherein the graphics processing unit is further configured to determine one or more historical poses of one or more elements of a scene corresponding to the first image and the second image based at least on a first timestamp of the first image or a second timestamp of the second image and provide the one or more historical poses to the 3D renderer for generating a first display image and a second display image.

12. The system of claim 9, wherein the graphics processing unit is further configured to rectify at least one of the first image or the second image.

13. The system of claim 9, wherein the graphics processing unit is further configured to remove artifacts from at least one of the first disparity offsets or the second disparity offsets.

14. The system of claim 9, wherein the motion estimator is further configured to determine the first disparity offsets by comparing the first image to the second image and the second disparity offsets by comparing the second image to the first image.

15. A non-transitory computer-readable medium comprising processor-executable instructions that when executed by one or more processors, cause the one or more processors to:
receive a first image from one or more cameras corresponding to a first view and a second image from the one or more cameras corresponding to a second view;
provide the first image and the second image to a motion estimator, the motion estimator determining first disparity offsets for the first image and second disparity offsets for the second image; and
generate, for rendering a three-dimensional (3D) image using the first image, the second image, and a change in at least one of position or orientation from detecting the first image to displaying the 3D image determined from motion data of the one or more cameras, a first depth buffer for the first image derived from the first disparity offsets and a second depth buffer for the second image derived from the second disparity offsets.

16. The computer-readable medium of claim 15, further comprising instructions that cause the one or more processors to reproject a first display image corresponding to the first image using the first depth buffer for presentation by a first display and a second display image using the second depth buffer for presentation by a second display.

17. The computer-readable medium of claim 15, further comprising instructions that cause the one or more processors to rectify one of the first image or the second image.

18. The computer-readable medium of claim 15, further comprising instructions that cause the one or more processors to remove one or more artifacts from the first disparity offsets or the second disparity offsets outputted from the motion estimator.

19. The computer-readable medium of claim 15, further comprising instructions that cause the one or more processors to determine one or more historical poses of one or more elements of a scene corresponding to the first image and the second image based at least on a first timestamp of the first image or a second timestamp of the second image and providing the one or more historical poses to a 3D renderer to generate a first display image and a second display image.

20. The computer-readable medium of claim 15, further comprising instructions that cause the one or more processors to filter or smooth one or more of the first disparity offsets or the second disparity offsets.

\* \* \* \* \*